(12) United States Patent
Smith et al.

(10) Patent No.: US 7,191,936 B2
(45) Date of Patent: Mar. 20, 2007

(54) AUTOMATED TELLER MACHINE

(75) Inventors: Martin R. Smith, Dundee (GB); Grant C. Paton, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/006,956

(22) Filed: Dec. 8, 2004

(65) Prior Publication Data

US 2005/0127161 A1 Jun. 16, 2005

(30) Foreign Application Priority Data

Dec. 11, 2003 (GB) .................................. 0328720.8
Jun. 2, 2004 (GB) .................................. 0412199.2

(51) Int. Cl.
*G06F 17/60* (2006.01)

(52) U.S. Cl. ..................... 235/379; 235/375

(58) Field of Classification Search ............. 235/379, 235/380, 375, 381; 902/3, 8, 9, 5, 12; 705/43–45
See application file for complete search history.

(56) References Cited

U.S. PATENT DOCUMENTS

| | | | |
|---|---|---|---|
| 3,664,910 A | 5/1972 | Hollie | |
| 6,193,152 B1 * | 2/2001 | Fernando et al. | 235/380 |
| 6,328,207 B1 * | 12/2001 | Gregoire et al. | 235/379 |
| 6,474,548 B1 | 11/2002 | Montross et al. | |
| 6,728,397 B2 * | 4/2004 | McNeal | 382/137 |
| 6,731,778 B1 * | 5/2004 | Oda et al. | 382/118 |
| 6,783,061 B2 * | 8/2004 | Graef et al. | 235/379 |
| 6,869,023 B2 * | 3/2005 | Hawes | 235/494 |
| 6,886,743 B2 * | 5/2005 | Brikho | 235/379 |
| 2002/0105665 A1 * | 8/2002 | Wasilewski et al. | 358/1.13 |
| 2002/0152166 A1 * | 10/2002 | Dutta et al. | 705/43 |
| 2003/0015583 A1 * | 1/2003 | Abdi et al. | 235/379 |
| 2003/0023557 A1 * | 1/2003 | Moore | 705/50 |
| 2003/0033252 A1 | 2/2003 | Buttridge et al. | |
| 2003/0036425 A1 * | 2/2003 | Kaminkow et al. | 463/25 |
| 2003/0038173 A1 * | 2/2003 | Blackson et al. | 235/379 |
| 2003/0079137 A1 | 4/2003 | Kraft | |
| 2003/0128866 A1 * | 7/2003 | McNeal | 382/115 |
| 2003/0217005 A1 | 11/2003 | Drummond et al. | |
| 2005/0097037 A1 * | 5/2005 | Tibor | 705/39 |

FOREIGN PATENT DOCUMENTS

| | | |
|---|---|---|
| EP | 0 729 120 A3 | 12/1996 |
| EP | 1 102 222 A2 | 5/2001 |
| GB | 2 369 914 A | 6/2002 |
| WO | 03/036570 A3 | 5/2003 |

* cited by examiner

*Primary Examiner*—Thien M. Le
*Assistant Examiner*—Edwyn Labaze
(74) *Attorney, Agent, or Firm*—Michael Chan

(57) ABSTRACT

An automated teller machine (10) comprises a fascia (12) having a check entry/exit slot (56), and a check processing module (60) for processing checks entered via the slot (56). The terminal (10) includes a control means (86), biometric data capture means (112, 156, 158), a printer (74) and a check transport mechanism (70) for transporting checks between the slot (56) and the printer (74). The control means is arranged to cause the printer (74) to print a representation of a biometric characteristic of a user onto a check during an attempt to deposit the check in the terminal (10).

11 Claims, 5 Drawing Sheets

AUTOMATED TELLER MACHINE

BACKGROUND OF THE INVENTION

The present invention relates to an automated teller machine (SST), such as an automated teller machine (ATM). In particular, the invention relates to an SST for cashing checks, such as a check cashing ATM.

A check cashing ATM allows a registered user, who typically does not have a bank account, to cash a check and receive money from the ATM in a public access, unattended environment. A user typically registers with an institution that owns or operates check cashing ATMs, and provides identification information (such as a social security number) and information about a check (usually a pay check) that he/she regularly receives. The registered user is typically provided with a card to initiate a check cashing transaction at a check cashing ATM.

The check information typically includes details of how frequently a check is paid (for example, every week), who the check is paid by (that is, the payor of the check), the payor's bank details (for example, a bank code identifying the name of the bank), the typical amount that the check is made out for, and such like.

To cash a check, a user enters his/her card at a check cashing ATM, then enters a check to be cashed through a check slot in the ATM'S fascia. The ATM draws in and processes this check. If the check is valid, and the details printed on the check match the check information provided during registration, then the ATM informs the user of a surcharge that will be applied if the user wishes to cash the check.

If the user agrees to the surcharge then cash is dispensed to the user and the check is stored within the ATM. If the user does not agree to the surcharge then the check is returned to the user via the check slot.

The check may be returned to the user for other reasons, for example, if the check is not complete, if the check has not been endorsed by the user, if the ATM decides that the details printed on the check do not match the check information provided by the user during registration, and such like.

On other embodiments checks can be cashed or merely deposited in a user's account without the aforementioned logging of regular checks.

One problem associated with check cashing ATMs relates to fraud and a further to tracing individual checks to users (who have accounts).

If a user can be persuaded that an invalid check, if deposited at an ATM, can be traced back to them, especially if that trace in incontrovertible then it is believed that fraud at deposit ATMs would be reduced. However, the problem of how to achieve this is as yet not entirely satisfactorily solved, despite the proliferation of security means available to the financial services industry.

SUMMARY OF THE INVENTION

It is among the objects of an embodiment of the present invention to obviate or mitigate the above disadvantage or other disadvantages of prior art automated teller machines.

According to a first aspect of the present invention there is provided an automated teller machine comprising a fascia having a check entry/exit slot, and a check processing module for processing checks entered via the slot; where the terminal includes a control means, biometric data capture means, a printer and a check transport mechanism for transporting checks between the slot and the printer, the control means being arranged to cause the printer to print a representation of a biometric characteristic of a user onto a check during an attempt to deposit the check in the terminal.

Preferably, the characteristic is only printed on the check, if the control means determines that the terminal can accept deposit of the check.

Preferably, the characteristic is a naturalistic, human-readable represent of the user's biometric characteristic.

Alternatively, the characteristic is a machine-readable representation of the user's biometric characteristic.

Preferably, the transport mechanism is arranged to transport unacceptable checks to a reject bin.

Alternatively, the transport mechanism is arranged to return unacceptable checks to the user.

Preferably, the terminal is specifically arranged for the deposit of a financial check, the terminal being arranged to provide the user with cash in return for the depositing of the check.

Preferably, the biometric data capture means includes a finger print scanner.

Alternatively, the biometric data capture means includes an Iris scanner, hand geometry or voice signature detection means.

Preferably, the terminal includes a display screen and control means arranged to control the display screen to present the user with an image of the deposited check including the representation of his or her biometric characteristic, during the deposit process.

According to a second aspect of the present invention there is provided a check processing module having an entrance port, control means, biometric data capture means, a printer and a check transport mechanism for transporting checks between the slot and the printer, the control means being arranged to cause the printer to print a representation of a biometric characteristic of a user onto a check during an attempt to deposit the check in the terminal.

According to a third aspect of the present invention there is provided a method of cashing financial instruments, the method comprising the steps of: transporting the financial instrument from an entrance slot to a process zone; determining whether to accept or reject the instrument; electronically acquiring a representation of a biometric characteristic of a user; printing the aforementioned representation on the financial instrument; and in the event of accepting the instrument, dispensing cash or depositing said cash in a user's account.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
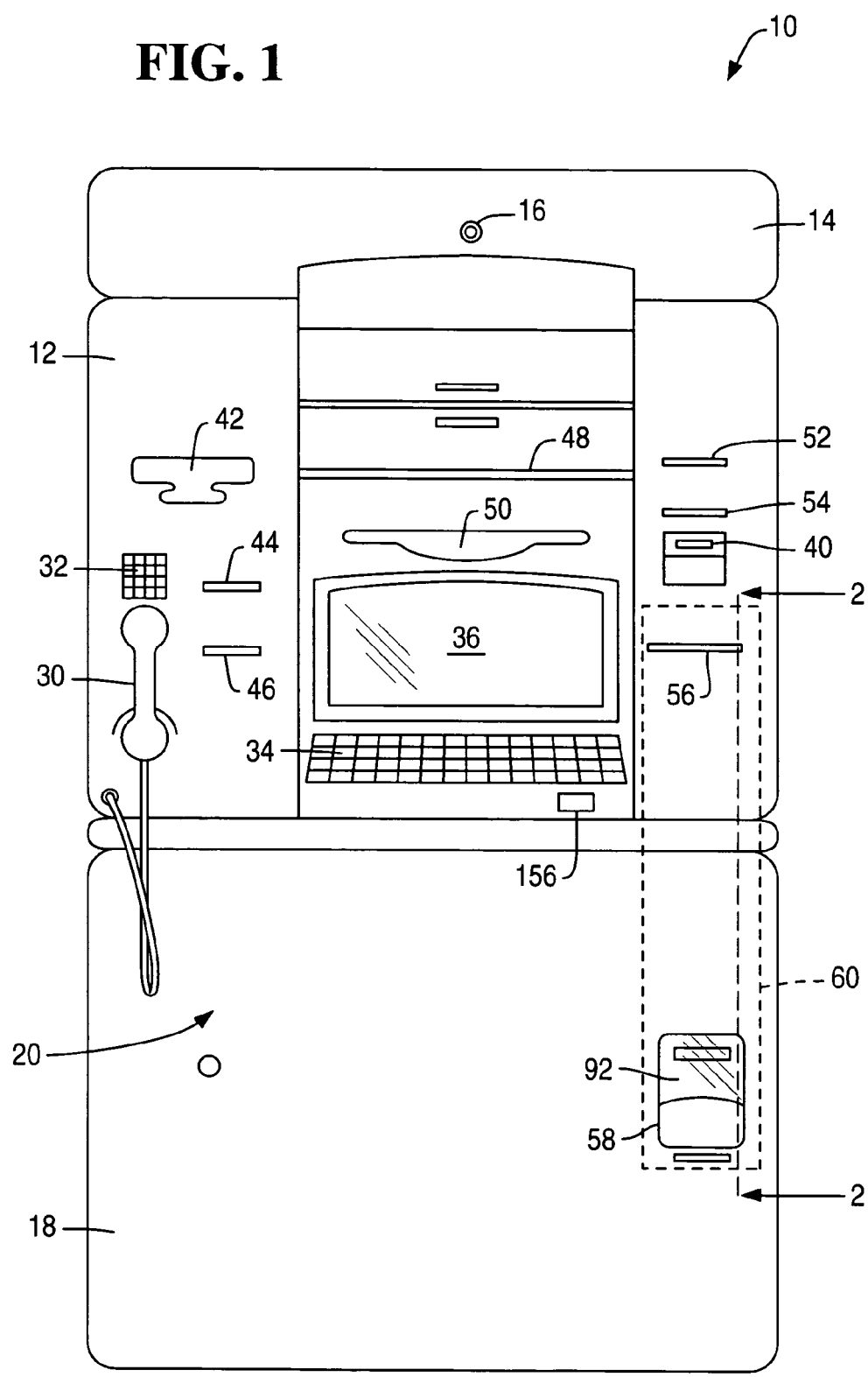
FIG. 1 is a pictorial diagram of an automated teller machine according to one embodiment of the present invention.

Reference is first made to FIG. 1, which illustrates an automated teller machine 10 in the form of a check cashing ATM. The ATM 10 comprises a fascia 12 pivotably coupled to a chassis (not shown); an upper panel 14 mounted to the chassis and defining an aperture 16 through which a camera (not shown) images a user of the ATM 10; and a lower panel 18 hingeably coupled to the chassis (not shown) so that the lower panel 18 can be opened to reveal a safe (not shown) mounted in the chassis (not shown).

When the lower panel 18 is open, the fascia 12 can be pivoted upwards to reveal ATM modules mounted within the chassis (not shown).

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call centre (not shown). The fascia 12 also includes an encrypting keyboard 34 for allowing a user to enter transaction details, and a display 36 for presenting screens to a user.

The fascia 12 also defines eight slots for receiving and dispensing media items, and a tray 40 into which coins can be dispensed. The slots include: a money order printer slot 42, a bunch note input slot 44, a bunch note exit slot 46, a statement output slot 48, a cash dispense slot 50, a card reader slot 52, a card issue slot 54, and a check input/output slot 56. The slots 42 to 56 and tray 40 are arranged so that when the fascia 12 is closed, the slots and tray align with corresponding ATM modules mounted within the ATM's chassis (not shown).

The user interface features described above are all provided on an NCR PERSONAS (trade mark) 5878 financial services centre ATM, available from NCR Financial Solutions Group Limited, Discovery Centre, 3 Fulton Road, Dundee, DD2 4SW, Scotland.

However, in this embodiment of the invention an NCR PERSONAS (trade mark) 5878 ATM has been modified to include a lower dispense area 58. The dispense area 58 is located beneath the check input/output slot 56 and is fed by a check processing module 60 located within the ATM chassis (not shown).

The fascia also includes a biometric module 112 mounted in the shelf portion and includes (i.) a sensor 156 for receiving a human finger and for capturing fingerprint details, and (ii.) an interface 158 for encrypting and relaying a captured fingerprint image. The sensor 156 protrudes through an aperture in the shelf portion, and the interface 158 is mounted behind the shelf portion.

The biometric sensor 156 is a Fingerloc (trade mark) AF-S2 fingerprint sensor, available from Authentec, Inc., P.O. Box 2719, Melbourne, Fla. 32902-2719, U.S.A.

Figure 4:
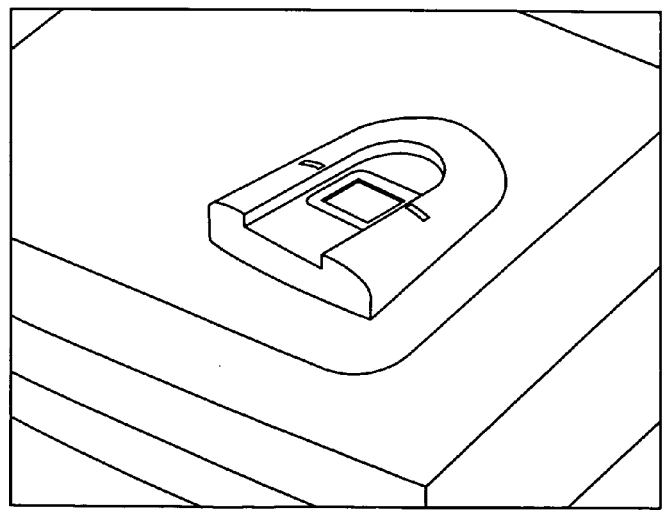
FIG. 4 is a pictorial diagram of a biometric sensor.

(See FIG. 4)

The sensor 156 comprises an array of pixels arranged in rows and columns. A fingerprint image is scanned by digitizing outputs from each row in a programmed sequence.

In other embodiments other biometric characteristics, such as Iris recognition can be utilized and appropriate scan means will be employed.

Figure 2:
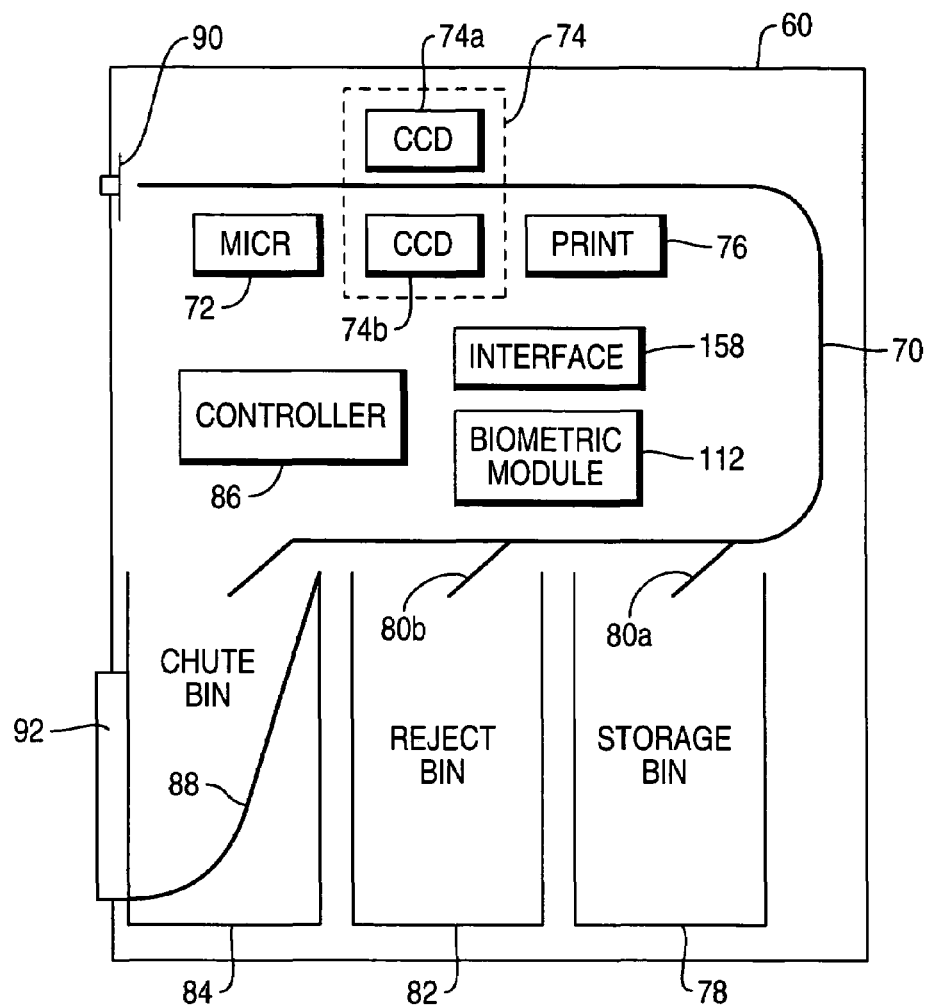
FIG. 2 is a simplified schematic sectional diagram showing a part (the check processing module) of the terminal of FIG. 1.
Figure 3:
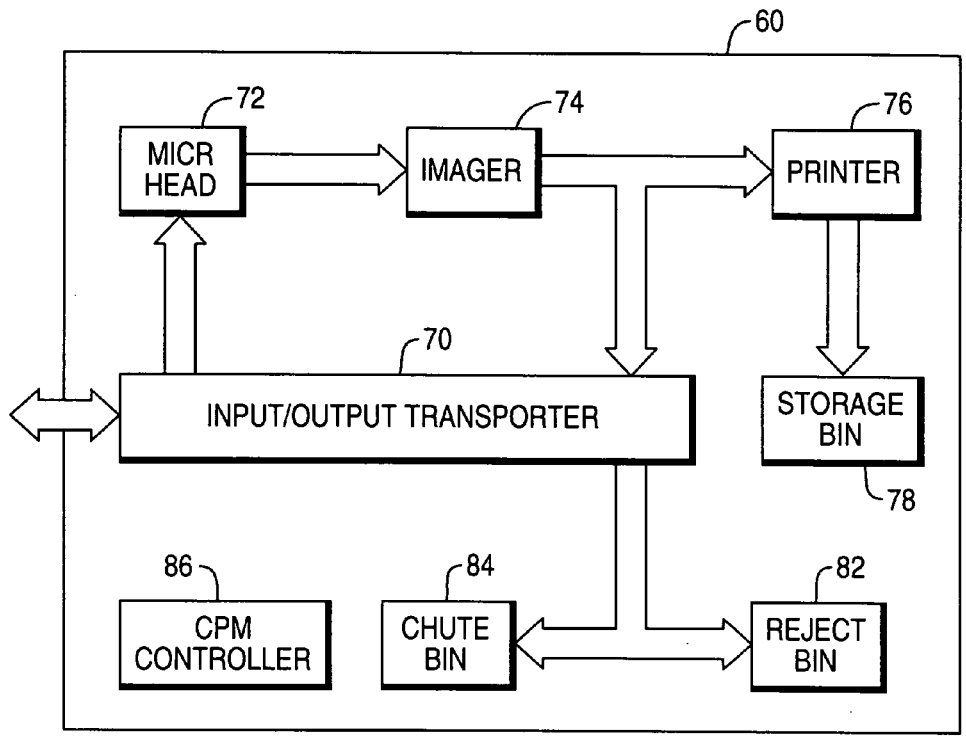
FIG. 3 is a pictorial diagram of a part (the lower dispense area) of the terminal of FIG. 1.

The check processing module (CPM) 60 will now be described with reference to FIG. 2 and FIG. 3. FIG. 2 is a simplified schematic sectional diagram (along line 2—2 in FIG. 1) showing part of the fascia 12 and lower panel 18, and the main parts of the CPM 60. FIG. 3 is a block diagram illustrating the main elements in the CPM 60.

The CPM 60 is a modified version of a conventional check processing module, such as the check processing module provided with the PERSONAS (trade mark) 5878 NCR ATM.

The CPM 60 comprises the following elements: a check input/output transport mechanism 70 including an alignment mechanism for aligning a check; a MICR head 72 for reading magnetic details on a code line of a check; an imager 74 including an upper 74a and lower 74b CCD camera for capturing an image of each side of a check (front and rear); a printer 76 for endorsing a check; and a storage bin 78 for storing processed checks. The transport mechanism 70 includes two divert gates 80a, 80b for diverting checks to either a reject bin 82 or a chute bin 84. The elements (70 to 82) are conventional and will not be described in detail herein.

The CPM 60 also includes a controller 86 for controlling the operation of the elements (70 to 80) within the CPM 60.

The chute bin 84 includes a chute 88 in the form of a steep, sloping plastics guide arranged to deliver a check from the transport mechanism 70 to the dispense area 58 using the force of gravity.

The CPM 60 also includes an entrance shutter 90 for opening and closing the check input/output slot 56, and a dispense area shutter 92 for allowing user access to the chute 88.

Figure 5A:
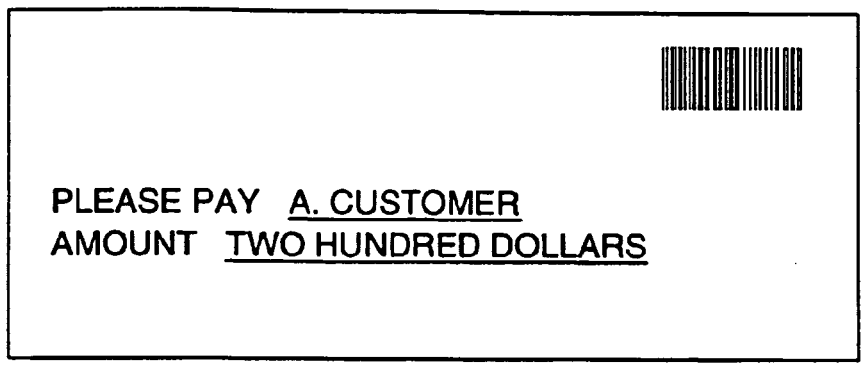
FIGS. 5a & 5b are illustrations of checks with printed biometric data in accordance with the present invention.
Figure 5B:
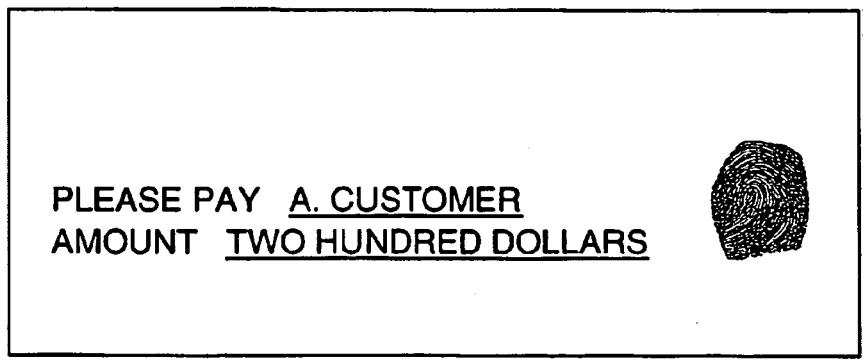

The controller 86, is adapted to control the printer 74 to print either a direct image or encrypted data characteristic of an image of the user's biometric characteristic on the check, as illustrated in FIGS. 5a and 5b.

A variation of this system would involve an encoded version of the biometric being printed on to the check or other media. For example, a 2D barcode or similar digital encoding scheme might be used to encode a digital representation of the fingerprint data. This has the advantage of reducing the dependence that the printing resolution needs to be high enough to print detailed fingerprints (as long as it is high enough to print a 2D barcode that is sufficient). Additionally, barcode readers are more prevalent than optical fingerprint image readers.

A typical transaction will now be described with reference to FIG. 6, which is a flowchart illustrating the steps involved in a check cashing transaction, and also with reference to FIGS. 1 to 5. Initially, the user enters their account card into the card reader slot 52, selects "check cashing" from a list of transaction options presented on the display 36, and inserts the check to be cashed through the check input/output slot 56.

The CPM controller 30 opens the slot shutter 90 to receive the check, and transports the received check (step 110) to the MICR head 72 where a code line on the check is read (step 112).

The transport mechanism 70 then transports the check to the imager, where both sides of the check are imaged (step 114).

The ATM 10 then verifies that the check has been completed correctly (step 116). If the check is incomplete, then the CPM 60 initiates a standard check return operation (STEP 118), which will not be described herein.

If the check is complete, then the ATM 10 requests the user to input a biometric characteristic, in this case supply a fingerprint (step 120).

In this embodiment the ATM 10 displays a charge that will be deducted for cashing the check (step 122) and requests the user to confirm that he is willing to pay this charge to cash the check (step 124).

If the user does not wish to pay the charge, then the CPM 60 initiates the aforementioned check return operation (step 118).

If the user accepts the charge, then the CPM 60 prints endorsement data onto the check (step 126), including printing an image of the user's fingerprint on the check.

The ATM 10 then displays an image of the check with the fingerprint printed thereon to the user on the display 36 (step 128) and dispenses cash (step 130) to the value of the courtesy amount of the check minus the charge levied for cashing the check.

The CPM 60 then transports the check to the storage bin 78 (step 132) for subsequent collection and further processing.

Various modifications may be made to the above described embodiment within the scope of the invention.

In other embodiments, other checks may be deposited than checks.

Also, the fingerprint sensor (or other biometric device) should also be capable of differentiating between a live person and a fake biometric. This is important in an unattended, self-service environment.

This system has a number of advantages principally, it does not require the on-line verification of biometric data since its purpose is more geared towards fraud prevention (by discouragement) and collection of additional data for the audit trail.

Figure 6:
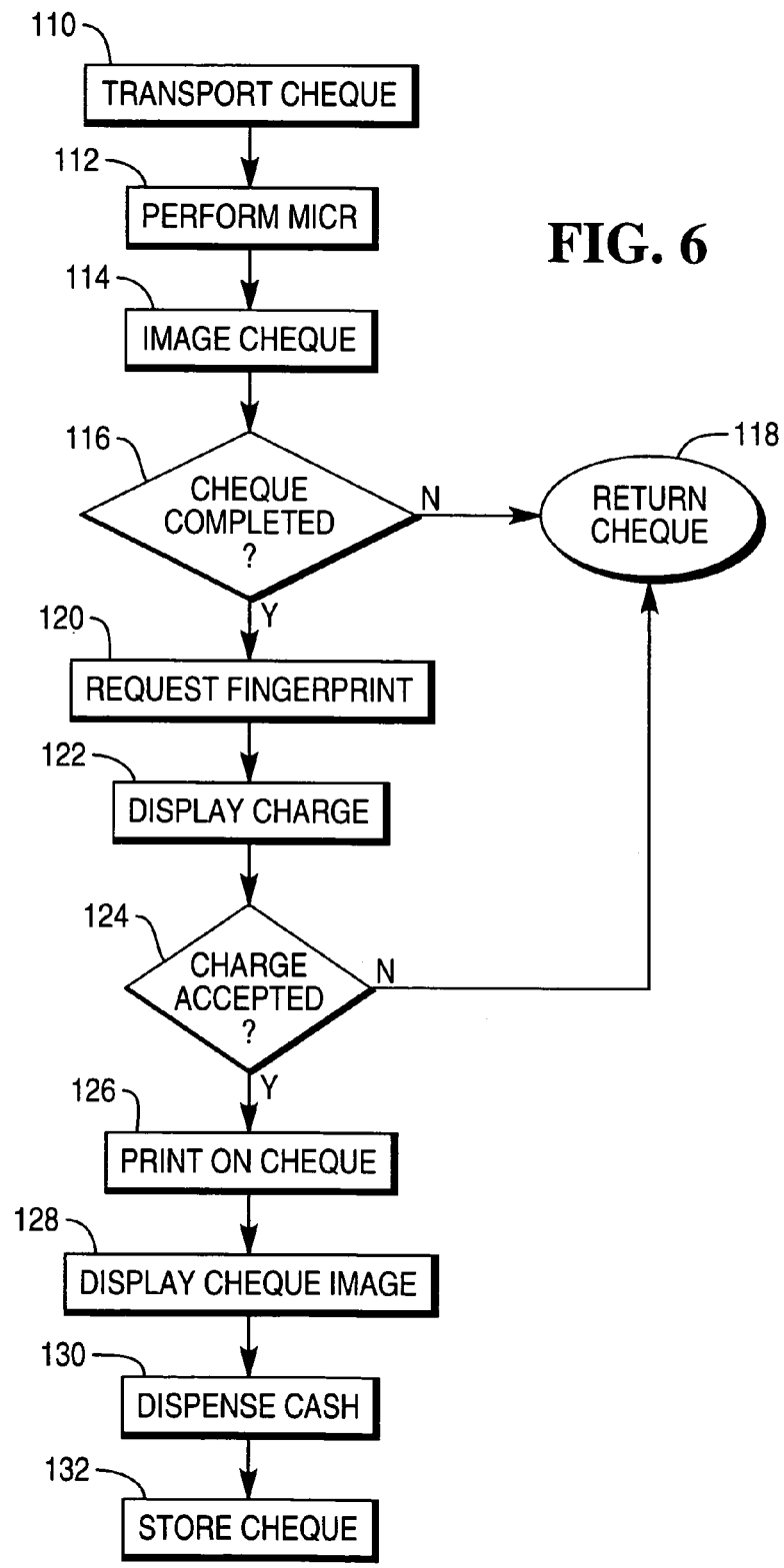
FIG. 6 is a flowchart illustrating the steps involved in a check cashing operation in accordance with the present invention.

Finally, instead of printing a representation of the biometric characteristic on the check, as per step 126 of FIG. 6, the control means 86 stores that representation in a memory associated with the image of the check. This embodiment could be utilized, for example, in an ATM arranged to provide check images for bank backroom processing instead of forwarding actual checks.

What is claimed is:

1. A method of operating a self-service terminal, the method comprising:
   receiving a financial instrument deposited by a user at the self-service terminal;
   transporting the deposited financial instrument to a processing zone to determine if the deposited financial instrument is acceptable;
   electronically acquiring a representation of a fingerprint of the user after the deposited financial instrument is determined to be acceptable;
   printing the electronically-acquired representation of the fingerprint of the user on the deposited financial instrument; and
   presenting the user with an image of the deposited financial instrument including the electronically-acquired representation of the fingerprint of the user;
   wherein the printing of the electronically-acquired representation of the fingerprint of the user on the deposited financial instrument is carried out only if the deposited financial instrument is determined to be acceptable.

2. A method as claimed in claim 1, wherein the electronically-acquired representation of the fingerprint of the user comprises a naturalistic, human-readable representation of the user's fingerprint.

3. A method as claimed in claim 1, wherein the electronically-acquired representation of the user's fingerprint is machine-readable.

4. A method of operating an automated teller machine (ATM), the method comprising:
   receiving a check deposited by an ATM customer;
   transporting the deposited check to a check processing zone to determine if the deposited check is acceptable;
   capturing a representation of a fingerprint of the ATM customer;
   printing the captured representation of the fingerprint of the ATM customer on the deposited check if the deposited check is determined to be acceptable; and
   presenting the ATM customer with an image of the deposited check including the captured representation of the fingerprint of the ATM customer.

5. A method as claimed in claim 4, wherein the captured representation of the fingerprint of the ATM customer comprises a naturalistic, human-readable representation of the ATM customer's fingerprint.

6. A method as claimed in claim 4, wherein the captured representation of the ATM customer's fingerprint is machine-readable.

7. A method as claimed in claim 4, further comprising:
   dispensing cash to the ATM customer.

8. A method as claimed in claim 4, further comprising:
   depositing cash in a financial institution account associated with the ATM customer.

9. A self-service terminal comprising:
   means for receiving a financial instrument deposited by a user;
   means for transporting the deposited financial instrument to a processing zone to determine if the deposited financial instrument is acceptable;
   means for electronically acquiring a representation of a fingerprint of the user;
   means for printing the electronically-acquired representation of the fingerprint of the user on the deposited financial instrument after the deposited financial instrument is determined to be acceptable; and
   means for presenting the user with an image of the deposited financial instrument including the electronically-acquired representation of the fingerprint of the user.

10. An automated teller machine (ATM) comprising:
    a fascia having a check entry/exit slot;
    a check processing module for processing checks entered via the slot;
    a printer;
    a check transport mechanism for transporting checks between the slot and the printer;
    a fingerprint image capture device for capturing a fingerprint of an ATM customer; and
    a controller for (i) determining if a deposited check is acceptable, (ii) controlling the fingerprint image capture device to capture a fingerprint of an ATM customer and (iii) controlling the printer to print a representation of the captured fingerprint of the ATM customer user onto the check after the fingerprint of the ATM customer has been captured and if the deposited check has been determined to be acceptable.

11. An ATM as claimed in claim 10, further comprising a display screen which is controlled by the controller to present an ATM customer with an image of the deposited check including the representation of the captured fingerprint of the ATM customer.

* * * * *